Patented Feb. 5, 1946

2,394,418

UNITED STATES PATENT OFFICE 2,394,418

REDUCTION OF COLOR IN VINYL RESINS

William M. Quattlebaum, Jr., and Charles A. Noffsinger, Charleston, W. Va., assignors to Carbide and Carbon Chemicals Corporation, a corporation of New York No Drawing. Application June 29, 1943, Serial No. 492,718

12 Claims. (Cl. 260—86)

Those artificial resins known collectively as vinyl resins have attained wide recognition in the field of plastics. Of this class, the resins which include a vinyl halide, usually vinyl chloride, in their constitution are probably most widely known, particularly the resins such as are formed by conjoint polymerization of vinyl chloride with vinyl esters of aliphatic acids or with other unsaturated polymerizable compounds.

These materials have the somewhat unfortunate property of tending to decompose when heated to the extent which is frequently required in their formation and fabrication into various products. Even though this decomposition may not materially detract from most of the qualities of the resins, it is accompanied by and evidenced as the development of color in the resin. For instance, an initially clear and colorless vinyl resin resulting from the conjoint polymerization of vinyl chloride with vinyl acetate will on heating, become faintly yellow at first, then on continued heating, the yellow color deepens and the resin color passes through the various shades of tan to brown, and, finally, to black and the resin chars when the ultimate limit of decomposition is approached. Usually, only the initial stages of color development need be considered, but these are sufficient to restrict certain uses of the resin regardless of the absence of real effect of this minor decomposition on other properties of the material.

This characteristic of these vinyl resins has naturally received much attraction, and many stabilizing substances have been proposed as means of preventing or retarding the heat decomposition of vinyl resins containing vinyl chloride or other halides. As a result, there can be added to or incorporated with the resins a number of stabilizing substances which are quite efficacious in decreasing the tendency of these materials to become colored (decomposed) when heated. Because it is believed that much of the effect of heat on these vinyl resins is due to the liberation of hydrogen halide from the polymer, the stabilizing substances have frequently been either basic substances to neutralize this acid or substances which combine readily with halogens and hydrogen halides to form relatively inert compounds.

Despite the progress which has been made in stabilizing vinyl resins containing vinyl halides against discoloration and decomposition, there has been little or no attention given to the elimination of that initial color which is developed by heating these materials. This latter is the subject of this invention and a principal object of the invention is to provide an effective means of decolorizing, or bleaching, color-forming substances that are produced in vinyl resins containing vinyl halides (chloride) by the action of heat.

We have found by test that this can be done by treating these vinyl resins with small amounts of unsaturated organic acids or anhydrides in which an olefinic double bond is conjugated with a carbon to oxygen double bond, as in a carboxyl group. Examples of useful materials of this type are aliphatic alpha, beta-olefinic unsaturated carboxylic acids and their anhydrides, such as maleic anhydride, maleic acid, and crotonic acid. The reduction of color in heat-discolored vinyl resins by means of this invention may be demonstrated, for example, by intimately combining the discolored resin with a small amount of one of the materials named, for instance by milling the resin with the treating substance, and then heating the treated resin for a short time. In practice, however, the bleaching compound is usually added before the color develops. For instance, a composition containing a conjoint polymer of vinyl chloride and vinyl acetate, 2% of a basic stabilizer, dibutyl tin dilaurate and 1% maleic anhydride, developed less yellow color on heating than did a similar composition containing no maleic anhydride. It must be understood that the treatment of this invention can not restore deeply colored or charred resins to their original state, but it will eliminate the lighter shades of heat-developed color in the resins and reduce the discoloration in most cases.

The invention is especially useful in reducing the yellow color that frequently develops in resins of the class described which have been stabilized against decomposition, but in which slight color nevertheless is present after prolonged or severe heat treatments.

The action of the treatment of this invention is not presently capable of ready explanation, and whether the treating substances reduce the color present in the resin by reaction with chromophoric bodies, comprising conjugated double bonds formed by partial decomposition of the resins, or by some less apparent mechanism cannot be stated.

The following examples will serve to illustrate the invention and the ways in which it can be carried out.

Example 1

A vinyl resin resulting from the conjoint polymerization of vinyl chloride and vinyl acetate and which contained 87% by weight of vinyl chloride in the polymer was intimately combined with 2% by weight of the resin of dibutyl tin dilaurate, a stabilizer previously proposed for reducing the tendency of resins of this class to decompose on exposure to heat. A sample of this resin was heated between platens at 150° C. for twenty minutes. At the end of this time the sample of resin was yellow in color. This yellowed resin was then mixed with 1% by weight of maleic anhydride on a differential roll mill. The sample was thereafter heated for an additional five minutes at 150° C.

At the end of this time it had lost much of its yellow color.

The tendency of vinyl resins as herein described to become discolored when heated is also present in the case of solutions of the resin in various solvents. If the solutions are subjected to long heating or to heating at high temperatures, they become colored and the color may vary from yellow to deep orange.

Example 2

A resin resulting from the conjoint polymerization of vinyl chloride and vinyl acetate, as described in Example 1, was dissolved in dibutyl sebacate and was heated for a considerable period of time until it developed a yellow color. Approximately 1% of maleic anhydride (based on the weight of the resin) was added to the solution and it was then further heated. A marked reduction in yellow color became apparent.

In addition to the foregoing instances in which compounds of maleic acid were found to reduce the color formed in vinyl resin compositions, we have also found that crotonic acid is effective in the same way whereas corresponding saturated compounds, such as butyric acid, 2-ethyl hexoic acid and stearic acid, were without effect. The quantity of the color reducing or color inhibiting substances may vary, depending upon the depth of color to be eliminated or the time of exposure to heat. Ordinarily this quantity ranges from 0.1% to about 5% by weight of the resin. Within this range approximately 1% to 2% is preferred. The extent of heating required for the compounds of this invention to exert their novel action in eliminating color from vinyl resin compositions may also vary considerably and, in general, it can be best specified as a temperature above the softening temperature of the resin and approximately equivalent to those temperatures which in the absence of the substance or of stabilizers will induce color formation.

Various modifications and other uses of the treatment described will be apparent to those skilled in the art and such modifications are included in the scope of the invention as defined by the appended claims. This application is a continuation-in-part of our copending application Serial No. 350,085, filed August 2, 1940.

We claim:

1. Method of inhibiting color caused by partial decomposition by heat of polymeric vinyl resins containing combined vinyl halide, which comprises mixing the polymeric resins wholly after their polymerization with from 0.1% to 5% of the resins by weight of a color-reducing substance from the group consisting of aliphatic alpha, beta-olefinic unsaturated carboxylic acids and their anhydrides and thereafter heating the resins, whereby the development of color in the resin is reduced or prevented by virtue of the conjugated linkage

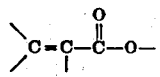

common to the members of said group.

2. Method of reducing color caused by partial decomposition by heat of polymeric vinyl resins containing combined vinyl halide which have been stabilized by the addition of a basic substance capable of neutralizing hydrogen halides, which comprises mixing the polymeric resins wholly after their polymerization with from 0.1% to 5% of the resins by weight of a color-reducing substance from the group consisting of aliphatic alpha, beta-olefinic unsaturated carboxylic acids and their anhydrides, and thereafter heating the resins, whereby the development of color in the resins is reduced or prevented by virtue of the conjugated linkage

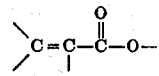

common to the members of said group.

3. Method of reducing color caused by partial decomposition by heat of polymeric vinyl resins containing combined vinyl chloride which have been stabilized by the addition of a basic substance capable of neutralizing hydrogen chloride, which comprises mixing the polymeric resins wholly after their polymerization with from 0.1% to 5% of the resins by weight of a color-reducing substance from the group consisting of aliphatic alpha, beta-olefinic unsaturated carboxylic acids and their anhydrides, and thereafter heating the resin, whereby the development of color in the resins is reduced by virtue of the conjugated linkage

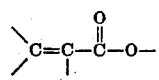

common to the members of said group.

4. Method of inhibiting color caused by partial decomposition by heat of a conjoint polymer of vinyl chloride with vinyl acetate, which comprises mixing the resin wholly after its polymerization with from 0.1% to 5% of the polymer by weight of a color-reducing substance from the group consisting of aliphatic alpha, beta-olefinic unsaturated carboxylic acids and their anhydrides, and thereafter heating the resin, whereby the development of color in the resin is reduced or prevented by virtue of the conjugated linkage

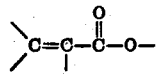

present in said acid.

5. Method of inhibiting color caused by partial decomposition by heat of a conjoint polymer of vinyl chloride with vinyl acetate, which comprises mixing the resin wholly after its polymerization with dibutyl tin dilaurate and with from 0.1% to 5% by weight of the polymer of maleic anhydride, and thereafter heating the resin.

6. Method of inhibiting color caused by partial decomposition by heat of a conjoint polymer of vinyl chloride with vinyl acetate, which comprises mixing the resin wholly after its polymerization with from 0.1% to 5% by weight of the polymer of maleic anhydride, and thereafter heating the resin.

7. A composition resistant to the discoloring effects of heat comprising a polymeric vinyl resin containing combined vinyl halide to which has been added wholly after its polymerization from 0.1% to 5% of the resin by weight of a color-reducing substance from the group consisting of aliphatic alpha, beta-olefinic unsaturated carboxylic acids and their anhydrides, whereby the development of color in the resin on heating is reduced or prevented by virtue of the conjugated linkage

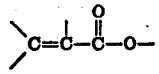

common to the members of said group.

8. A composition resistant to the discoloring effects of heat comprising a polymeric vinyl resin containing combined vinyl halide and stabilized against decomposition caused by heat by the inclusion of a basic substance, to which has been added wholly after the polymerization of the resin from 0.1% to 5% of the resin by weight of a color-reducing substance from the group consisting of aliphatic alpha, beta-olefinic unsaturated carboxylic acids and their anhydrides, whereby the development of color in the resin on heating is reduced by virtue of the conjugated linkage

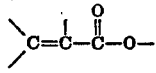

common to the members of said group.

9. A composition resistant to the discoloring effects of heat comprising a polymeric vinyl resin containing combined vinyl chloride and stabilized against decomposition caused by heat by the inclusion of a basic substance, to which has been added wholly after the polymerization of the resin from 0.1% to 5% of the resin by weight of a color-reducing substance from the group consisting of aliphatic alpha, beta-olefinic unsaturated carboxylic acids and their anhydrides, whereby the development of color in the resin on heating is reduced by virtue of the conjugated linkage

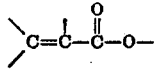

common to the members of said group.

10. A composition resistant to the discoloring effects of heat comprising a conjoint polymer of vinyl chloride with vinyl acetate to which has been added wholly after the polymerization of the resin from 0.1% to 5% of the polymer by weight of a color-reducing substance from the group consisting of aliphatic alpha, beta-olefinic unsaturated carboxylic acids and their anhydrides, whereby the development of color in the resin on heating is reduced or prevented by virtue of the conjugated linkage

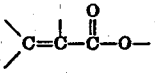

common to the members of said group.

11. A composition resistant to the discoloring effects of heat comprising a conjoint polymer of vinyl chloride with vinyl acetate to which dibutyl tin dilaurate and from 0.1% to 5% by weight of the polymer of maleic anhydride have been added wholly after the polymerization of the resin.

12. A composition resistant to the discoloring effects of heat comprising a conjoint polymer of vinyl chloride with vinyl acetate to which from 0.1% to 5% by weight of the polymer of maleic anhydride has been added wholly after the polymerization of the resin.

WILLIAM M. QUATTLEBAUM, JR.
CHARLES A. NOFFSINGER.